United States Patent
Wohlgemuth

(10) Patent No.: US 6,672,317 B2
(45) Date of Patent: Jan. 6, 2004

(54) CLEANING DEVICE FOR ROTATIONALLY SYMMETRICAL BODIES

(75) Inventor: Oliver Wohlgemuth, Berlin (DE)

(73) Assignee: Beissbarth GmbH, Munich (DE)

( * ) Notice: Subject to any disclaimer, the term of this patent is extended or adjusted under 35 U.S.C. 154(b) by 20 days.

(21) Appl. No.: 09/839,953

(22) Filed: Apr. 19, 2001

(65) Prior Publication Data

US 2002/0002990 A1 Jan. 10, 2002

(51) Int. Cl.[7] .................................................. B08B 3/02
(52) U.S. Cl. ...................... 134/105; 134/123; 134/184; 134/169 A; 134/197; 134/157
(58) Field of Search .................................. 134/184, 186, 134/169 A, 123, 137, 140, 147, 157, 159, 105

(56) References Cited

U.S. PATENT DOCUMENTS

| | | | |
|---|---|---|---|
| 510,680 A | * | 12/1893 | Diffenbach |
| 525,574 A | * | 9/1894 | Arbuckel |
| 762,618 A | * | 6/1904 | Diederich |
| 830,463 A | * | 9/1906 | Sutherlin |
| 2,712,320 A | * | 7/1955 | Schroeder et al. |
| 3,026,093 A | * | 3/1962 | Haan et al. |
| 3,121,437 A | * | 2/1964 | Tomchak |
| 3,385,570 A | * | 5/1968 | Pijls et al. |
| 3,640,295 A | * | 2/1972 | Peterson |
| 4,057,070 A | * | 11/1977 | van Amerongen et al. |
| 4,191,611 A | * | 3/1980 | Rushing et al. |
| 4,224,110 A | * | 9/1980 | McCord |
| 4,272,301 A | * | 6/1981 | Galbraith et al. |
| 4,561,902 A | * | 12/1985 | Lee |
| 4,618,263 A | * | 10/1986 | McCord |
| 4,671,206 A | * | 6/1987 | Hoppestad et al. |
| 4,909,266 A | * | 3/1990 | Massa |
| 4,950,505 A | * | 8/1990 | Fogal |
| 5,058,611 A | * | 10/1991 | Liers et al. |
| 5,098,744 A | * | 3/1992 | Engren |
| 5,337,446 A | * | 8/1994 | Smith et al. |
| 5,509,431 A | * | 4/1996 | Smith, Jr. et al. |
| 5,711,327 A | * | 1/1998 | Fields |
| 5,865,199 A | * | 2/1999 | Pedziwiatr et al. |
| 5,911,259 A | * | 6/1999 | Baldi |
| 6,090,213 A | * | 7/2000 | Moyers |
| 6,102,056 A | * | 8/2000 | Kotsopey |
| 6,488,037 B1 | * | 12/2002 | Guldi |

FOREIGN PATENT DOCUMENTS

| | | | |
|---|---|---|---|
| DD | 286524 A | | 1/1991 |
| DE | 1530288 | * | 4/1970 |
| DE | 2325484 | * | 12/1974 |
| DE | 40 38 662 | | 6/1992 |
| GB | 2 148 862 | | 6/1995 |
| JP | 8-281225 | * | 10/1996 |
| JP | 11-99368 | * | 4/1999 |
| WO | WO 90 11210 | | 10/1990 |
| WO | WO 01/14072 | | 3/2001 |

* cited by examiner

*Primary Examiner*—Frankie L. Stinson
(74) *Attorney, Agent, or Firm*—Blakely, Sokoloff, Taylor & Zafman LLP

(57) ABSTRACT

This invention relates to a cleaning device for rotationally symmetrical bodies, in particular for vehicle wheel rims with or without tires. Said device is designed for mechanical cleaning, using a moving cleaning fluid in a cleaning bath (20). The cleaning bath (20) has at least one vibrator (34 to 37) which places a cleaning fluid in a state of turbulence in the ultrasound region. A heater (38) is also provided in order to heat the cleaning fluid and is located in the cleaning unit. A holder (30) is arranged in the cleaning unit in order to accommodate a receiving device which can e swiveled inwards or swiveled outwards and which is designed to hold the rotationally symmetrical body that is to e cleaned.

50 Claims, 3 Drawing Sheets

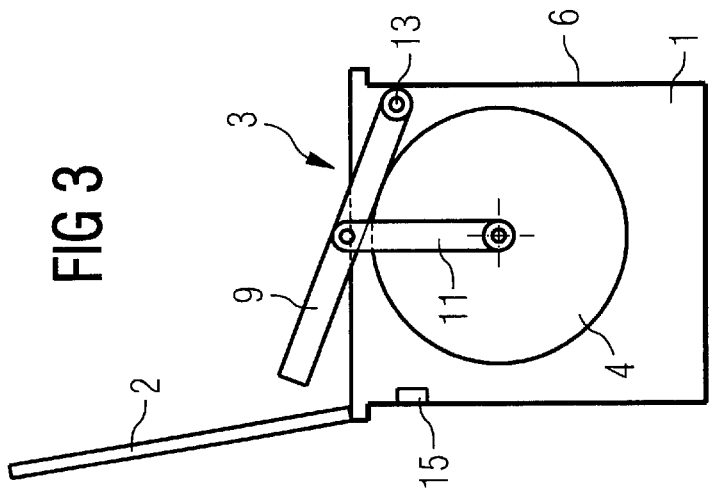
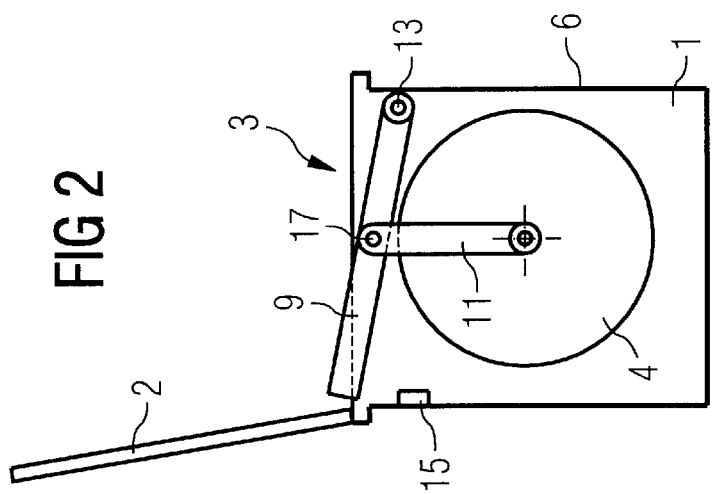
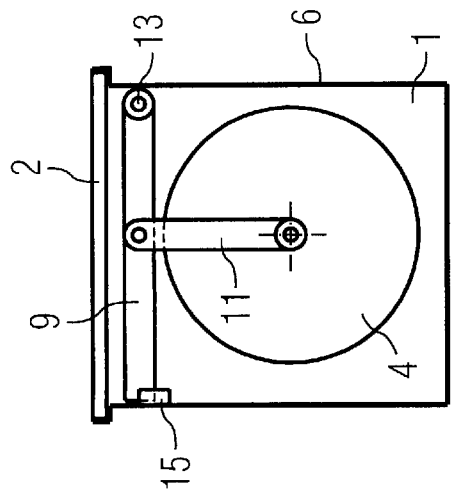

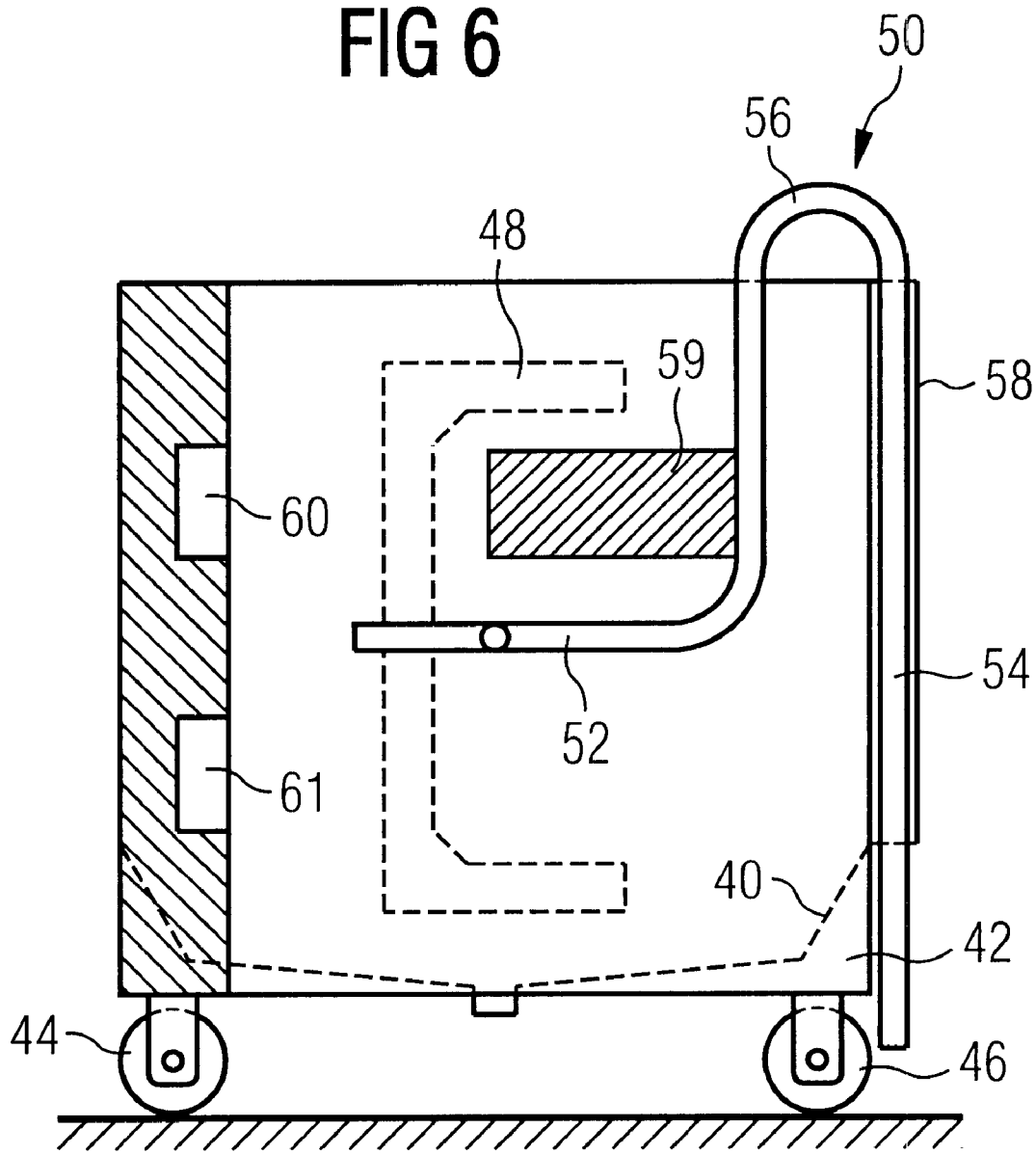

CLEANING DEVICE FOR ROTATIONALLY SYMMETRICAL BODIES

The invention relates to a cleaning device for rotationally symmetrical bodies, in particular for vehicle wheel rims with or without tires, out of the steel and of aluminum as well for mechanical cleaning by means of an agitated cleaning fluid in a cleaning bath.

BACKGROUND OF THE INVENTION

The cleaning of vehicle wheel rims is effected, in practice, independently of the dimensions thereof. Whereas the cleaning of truck wheel rims is effected almost without exception on the vehicle, car wheel rims are cleaned while mounted to the car as well as separately from the car, which means separate and for each single rim. The cleaning is effected manually by means of fluid and, for the most part, using of high pressure cleaning apparatus. Water with cleaning additives is used as cleaning fluid. The high water consumption as cleaning fluid has a disadvantageous effect in the cleaning process besides of the high time expenditure. Furthermore, the cleaning effect is often unsatisfactory depending on the degree of dirtying of the wheel rims with or without tires after a first cleaning run. Furthermore, the surface of the wheel rim is damaged in the course of the manual cleaning.

The WO 90/11210 discloses an apparatus for washing a vehicle tire which apparatus comprises a housing forming a washing space, inside which a tire is placed, nozzle means in the housing for spraying wash liquid on the tire, and pump means for delivering the wash liquid to the nozzle means which are arranged on both sides of the tire.

SUMMARY OF THE INVENTION

The invention is based on the problem to provide for a cleaning apparatus by which the dirt adhering to a rotationally symmetrical body, in particular wheel rims with or without tire, can be removed efficiently with simple means with a small expenditure of manual labor and at a small time expenditure.

This object is attained by a cleaning apparatus which is characterized in that the cleaning bath comprises at least one vibrator placing the cleaning fluid in a state of turbulence in the ultrasound region. The use of the cleaning apparatus of the invention has the effect that the dirt adhering to a body to be cleaned in particular to a vehicle wheel/wheel rim and to the tires which are also present, can be removed efficiently with a small expenditure on manual labor in a manner saving the body or the material of the wheel rims and the tires. Furthermore, the use of cleaning fluid is reduced to a minimum.

An advantageous embodiment of the inventive cleaning device is characterized by a heater for the cleaning fluid. By heating the cleaning fluid, the cleaning efficiency of the cleaning fluid is put up.

A further advantageous embodiment of the inventive cleaning device is characterized by a holder having an inwardly and outwardly swiveable receiving device for the rotationally symmetrical body to be cleaned. By means of such a holding/receiving device, the rotational symmetrical body, in particular the wheel rim with or without tire, can be easily submerged into the cleaning bath and removed therefrom again. If the rotationally symmetrical body is a wheel rim with a tire, where the specific weight of the wheel rim with the tire is smaller than water, it can be achieved by means of holding/receiving device furthermore that the wheel rim with the tire can be submerged completely into the cleaning bath.

A further advantageous embodiment of the inventive cleaning device is characterized in that the vibrator consists out of a piezoelectric transducer. There is a series of possibilities to agitate a fluid with ultrasound oscillations, where, however, piezoelectric transducers provide a cost saving and rugged and reliable solution for this purpose.

A further advantageous embodiment of the inventive cleaning device is characterized in that the cleaning bath is heat isolated and/or oscillation dampened and/or sound insulated. A further advantageous embodiment of the inventive cleaning device is characterized in that the cleaning bath is closed by means of a heat isolated and/or sound isolated and/or oscillation dampened cover. Thereby, on the one end, a dirtying or other detrimental effect to the environment of the cleaning device, for example by heat, is prevented and, on the other end, the rotational body can also be kept down by means of the cover in the cleaning fluid.

A further advantageous embodiment of the inventive cleaning apparatus is characterized by a feed line adapted to be shut off and an drain line adapted to be shut off. Thereby, the cleaning apparatus is made mobile and can be connected at different locations in a work shop to a water supply line and a draining line. When moving the cleaning apparatus from one location of use to another, no cleaning fluid can leak out even if the cleaning bath is still filled.

A further advantageous embodiment of the inventive cleaning apparatus is characterized in that the cleaning bath is connected by means of the feed line adapted to be shut off and the drain line adapted to be shut off with a dirt and oil separator for separating the polluting materials contained in the cleaning fluid. Thereby, not only the cleaning of the rotational body but also the disposal of the dirt and oil which is washed off, is insured. Therefore, also a closed loop for the cleaning fluid can be built up whereby the usage of the cleaning fluid is further reduced.

A further advantageous embodiment of the inventive cleaning apparatus is characterized in that the rotational body and the wheel rim respectively are arranged rotatably on the receiving device. The rotational body can, therefore, be rotated during the cleaning procedure whereby the cleaning action is improved since the ultrasound waves can attack all locations of the wheel rim of the wheel. Therefore, no specific dirt remainders remain on the rotational body.

A further advantageous embodiment of the inventive cleaning apparatus is characterized in that a rotational drive is provided for the rotational body or bodies and the wheel rim or wheel rims respectively which are rotatably supported on the receiving device. In principal, the rotational bodies could be turned around also by hand during the cleaning procedure. A rotation drive which can also be driven by a motor, facilitates, however, the turning around of the rotational body and, therefore, takes up work from the operator.

Further advantageous embodiments of the inventive cleaning apparatus are characterized in the rest of the sub claims.

A further understanding of the nature and advantages of the embodiments of the present invention may be realized by reference to the remaining portions of the specification and the drawings.

BRIEF DESCRIPTION OF THE DRAWINGS

FIG. 1 is a schematical representation of a cleaning apparatus in operating condition;

FIG. 2 a schematical representation of the cleaning apparatus of FIG. 1 with open flap cover;

FIG. 3 a schematical representation of the cleaning apparatus of the FIGS. 1 and 2 with open flap cover and with a holding device swiveled out of the cleaning bath;

FIG. 6 a further embodiment of the cleaning apparatus in schematical side elevation.

DESCRIPTION OF THE SPECIFIC EMBODIMENTS

Figure 4:
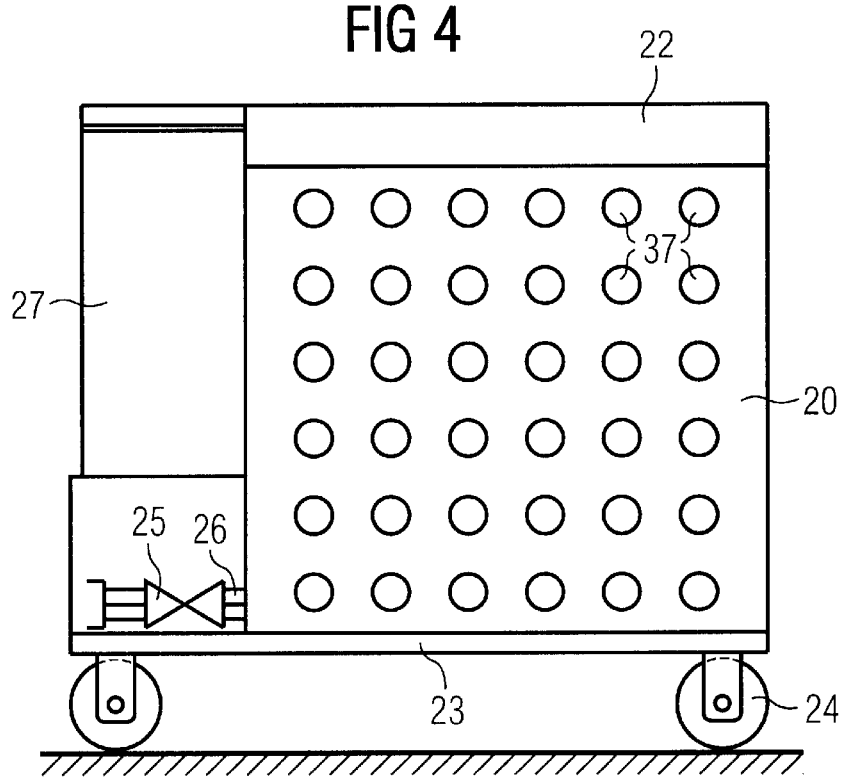
FIG. 4 a further embodiment of the cleaning apparatus in side elevation.

A cleaning apparatus consists of a cleaning bath 1 which may be closed by means of a flap cover 2, and a holding device 3 having a moveable arm 9 and a receiving device 11 for receiving at least one wheel rim 4 or a complete wheel 4 and two vibrators 5. The vibrators 5 are arranged in the cleaning bath 1 near to the opposite side walls 6 respectively thereof.

The cleaning fluid is put into oscillations in the ultrasound region or agitated respectively by means of vibrators. The oscillation frequency is preferably between 25 and 30 kHz. At this oscillating frequency, the dirtying of the wheel rim and the tire respectively is effectively removed.

The cleaning bath 2 is provided with a supply and a drainage means for the required cleaning fluid, and it is provided with a frame made out of square profiles for protecting the oscillators and for stabilizing the side walls 6. The cleaning bath 1 as well as the flap cover 2 are heat isolated and/or oscillation dampened and/or sound insulated. Furthermore, the flap cover 2 is provided with industrial gas springs.

In the embodiment of the FIGS. 1 to 3, the holding device 3 comprises a moveable arm 9 and a receiving device 11. The moveable arm 9 is pivotally supported at one end in a holder 13, and its other end rests on a support 15 in the closed state. The receiving device 11 is pivotally connected to the moveable arm 9 also by means of swivel connection 17. By means of this holding device 3, the wheel 4 can, therefore, be submerged easily into the cleaning bath or can be removed therefrom.

Figure 5:
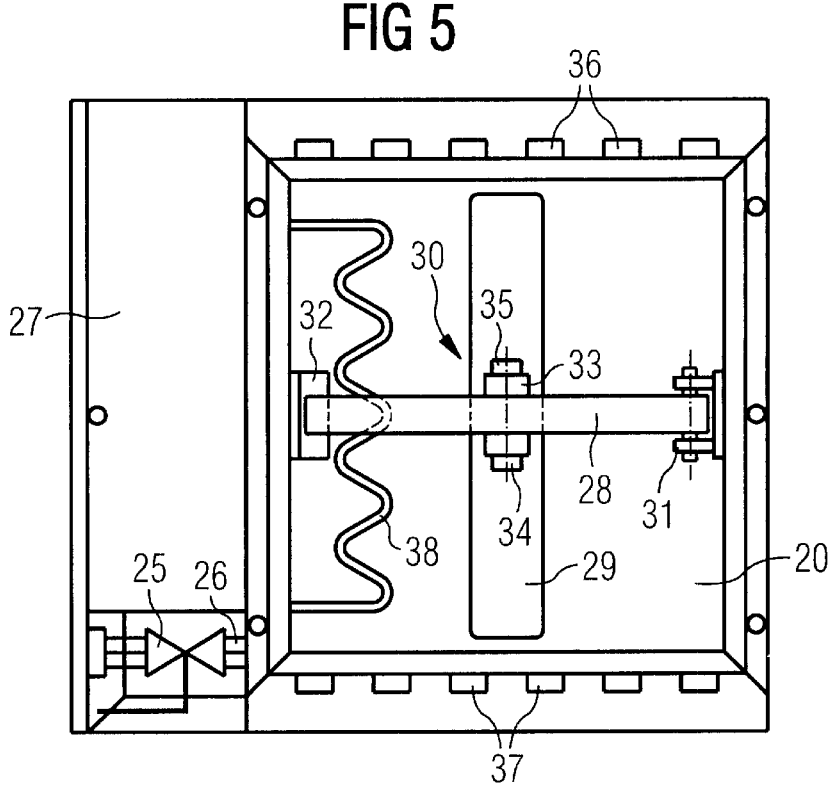
FIG. 5 the cleaning apparatus of FIG. 4 in top elevation.

In the FIGS. 4 and 5, a further embodiment of the inventive cleaning apparatus is shown. The cleaning apparatus comprises a bath 20 with a cover 22, a frame 23 which carries the bath 20 and is provided with wheels 24 in order to facilitate loading and downloading of the cleaning apparatus to or from a transportation vehicle respectively. In the FIGS. 4 and 5, there is shown a drain connection 26 which may be shut off by means of a valve 25. The supply and drainage of the cleaning bath 20 is connected to a reservoir (not shown) as well as to a cleaning circuit for the cleaning fluid (not shown) comprising a filter circuit and an oil separator.

As is shown in FIG. 5 in top elevation, a holding device 30 formed by a manually swiveable moving arm 28 and a receiving device 29 and provided for one or two wheel rims or wheels to be cleaned is fixed to a side wall of the cleaning bath 20 from the inside thereof, which holding device serves for feeding or removing the wheel rims/wheels into and out of the cleaning bath respectively and which may be swiveled by means of a crank (not shown) into the respectively required position. The wheel rims/car wheels are rotatably supported on the receiving device and are coupled to a drive (not shown) which drives the wheel rims/car wheels to be cleaned to a rotational movement.

The moving arm 28 is, in turn, swiveable supported at one end of a swivel holder 31, whereas the other end of the moving arm 28 rests on a support device 32 when the moving arm 28 is in its operating position. The moving arm 28 is connected by means of swivel connection and a bar 33 with the receiving device 29 which, in this embodiment, is formed by a rod with one support for a wheel on both ends which rod is arranged essentially perpenticular to the moving arm 28.

As can be seen from the FIGS. 4 and 5, two ultrasound transducers 34, 35 are arranged on the receiving device 29 such that they apply sound to the opposite sides of wheels inserted into the device. A plurality of further ultrasound vibrators 36,37 are arranged on the outside of the bath 20, as is schematically shown in FIG. 4. Thereby, the application of sound of the area of the outside surfaces of the wheels is insured.

On the front side of the cleaning apparatus, there is a circuit box 27 having mounted electric control and operating elements at its door. All electrical elements of the cleaning apparatus and the ultrasound generators for the vibrators 36, 37 are located in the circuit box 27.

Furthermore, the cleaning apparatus is provided with a heating device arranged in the cleaning bath 20 in form of a heating coil 38 for heating the cleaning fluid. Of course, also other heating devices may be used for heating the cleaning fluid.

FIG. 6 shows a further embodiment of the inventive cleaning apparatus with a cleaning bath 40 which is arranged in a stand 42 which is provided with wheels 44,46. In order to rotatably support a wheel rim 48, a holding device 50 is provided which comprises a receiving leg 52 and a supporting leg 54 which is connected to the receiving leg 52 via a bent portion 56 which serves to lift the holding device 50 by hand. The supporting leg 54 is arranged in a holder 58 such that it may be moved upwards and downwards and locked. The application of sound to the wheel rim 48 is made by an ultrasound vibrator 59 which is arranged on the receiving leg 52 such that it applies sound to one side of the wheel rim 48. On the opposite side to ultrasound vibrator 58 of the wheel rim 48 one or several ultrasound vibrator 68, 61 are arranged in order to apply sound also from this side to the wheel rim 48. It can be seen that the inside of the wheel rim (right side in FIG. 6) is completely attacked by sound when the wheel rim 48 is rotated on the supporting arm 52.

It is to be understood that the above description is intended to be illustrative and not restrictive. Many embodiments will be apparent to those skilled in the art upon reviewing the above description. Those skilled in the art will recognize as an equivalent or alternative method of tire testing and combining a tire testing machine with a wheel balancing machine. The scope of the invention should, therefore, be determined not as reference to the above description, but should instead be determined with reference to the apended claims along with the full scope of equivalence to which such claims are entitled.

What is claimed is:

1. A cleaning apparatus for cleaning rotationally symmetrical bodies, comprising:
    a cleaning bath, including one or more walls, containing cleaning fluid into which the rotationally symmetrical bodies may be submerged, wherein the cleaning bath has one or more characteristics selected from a group consisting of heat isolated, oscillation dampened, and sound isolated;
    a plurality of ultrasound vibrators to agitate the cleaning fluid in the cleaning bath to place the cleaning fluid in a state of turbulence near the ultrasound vibrators; and a holder having an inwardly and outwardly swiveable receiving device to receive the rotationally symmetrical bodies to be cleaned.

2. The cleaning apparatus according to claim 1, further comprising a heater to heat the cleaning fluid.

3. The cleaning apparatus according to claim 1, wherein at least one of the plurality of ultrasound vibrators comprises a piezoelectric transducer.

4. The cleaning apparatus according to claim 1, wherein the plurality of ultrasound vibrators are arranged in the cleaning bath to be completely surrounded by the cleaning fluid.

5. The cleaning apparatus according to claim 1, wherein at least one of the plurality of ultrasound vibrators is operated at 25 to 30 kHz.

6. The cleaning apparatus according to claim 1, wherein the cleaning bath further comprises one from a group consisting of a heat isolated cover, a sound isolated cover, and an oscillation dampened cover.

7. The cleaning apparatus according to claim 1, further comprising:
   a supply line, the supply line operable to shut off flow therethrough; and
   a drain line, the drain line operable to shut off flow therethrough.

8. The cleaning apparatus according to claim 1, wherein the cleaning bath is coupled via a supply line and a drain line to a dirt and oil separator for separating pollution material contained in the cleaning fluid, the supply line and the drain line operable to shut off flow therethrough.

9. The cleaning apparatus according to claim 1, further comprising a holding device coupled to the cleaning bath.

10. The cleaning apparatus according to claim 1, further comprising a control apparatus to control at least one of the plurality of ultrasound vibrators.

11. The cleaning apparatus according to claim 1, wherein the rotationally symmetrical bodies are tires.

12. A cleaning apparatus for cleaning rotationally symmetrical bodies, comprising:
   a cleaning bath, including one or more walls, containing cleaning fluid into which the rotationally symmetrical bodies may be submerged, wherein the cleaning bath has one or more characteristics selected from a group consisting of heat isolated, oscillation dampened, and sound isolated;
   a plurality of ultrasound vibrators to agitate the cleaning fluid in the cleaning bath to place the cleaning fluid in a state of turbulence near the ultrasound vibrators; and
   a holding device arranged in a receiving holder in the cleaning bath, the holding device being structurally separable from the cleaning apparatus.

13. The cleaning apparatus according to claim 12, wherein a rotational body and a wheel rim are arranged rotatably in the receiving holder.

14. The cleaning apparatus according to claim 13, further comprising:
   a rotational drive to drive the rotationally symmetrical bodies, the rotationally symmetrical bodies being rotatably supported on a receiving device in the cleaning bath.

15. The cleaning apparatus according to claim 14, wherein the rotationally symmetrical bodies are tires.

16. A cleaning apparatus for cleaning rotationally symmetrical bodies, comprising:
   a cleaning bath, including one or more walls, containing cleaning fluid into which the rotationally symmetrical bodies may be submerged, wherein the cleaning bath has one or more characteristics selected from a group consisting of heat isolated, oscillation dampened, and sound isolated;
   a plurality of ultrasound vibrators to agitate the cleaning fluid in the cleaning bath to place the cleaning fluid in a state of turbulence near the ultrasound vibrators; and
   a holding device to receive at least one wheel rim irrespective of whether the wheel rim has a tire attached thereto.

17. A cleaning apparatus for cleaning rotationally symmetrical bodies, comprising:
   a cleaning bath, including one or more walls, containing cleaning fluid into which the rotationally symmetrical bodies may be submerged, wherein the cleaning bath has one or more characteristics selected from a group consisting of heat isolated, oscillation dampened, and sound isolated;
   a plurality of vibrators on the walls of the cleaning bath to agitate the cleaning fluid in the cleaning bath to place the cleaning fluid in a state of turbulence;
   a heater to heat the cleaning fluid; and
   a holding device arranged in a receiving holder in the cleaning bath, the holding device being structurally separable from the cleaning apparatus.

18. The cleaning apparatus of claim 17, wherein at least one of the plurality of vibrators comprises an ultrasound vibrator to place the cleaning fluid in a state of turbulence near the ultrasound vibrator.

19. The cleaning apparatus according to claim 18, wherein at least one of the plurality of ultrasound vibrators is operated at 25 to 30 kHz.

20. The cleaning apparatus according to claim 17, wherein at least one of the plurality of vibrators comprises a piezoelectric transducer.

21. The cleaning apparatus according to claim 17, wherein the plurality of vibrators are arranged in the cleaning bath to be completely surrounded by the cleaning fluid.

22. The cleaning apparatus according to claim 17, wherein the cleaning bath further comprises one from a group consisting of a heat isolated cover, a sound isolated cover, and an oscillation dampened cover.

23. The cleaning apparatus according to claim 17, further comprising:
   a supply line, the supply line operable to shut off flow therethrough; and
   a drain line, the drain line operable to shut off flow therethrough.

24. The cleaning apparatus according to claim 17, wherein the cleaning bath is coupled via a supply line and a drain line to a dirt and oil separator for separating pollution material contained in the cleaning fluid, the supply line and the drain line operable to shut off flow therethrough.

25. The cleaning apparatus according to claim 17, further comprising a holding device coupled to the cleaning bath.

26. The cleaning apparatus according to claim 17, further comprising a control apparatus to control at least one of the plurality of vibrators.

27. The cleaning apparatus according to claim 17, wherein the rotationally symmetrical bodies are tires.

28. A cleaning apparatus for cleaning rotationally symmetrical bodies, comprising:
   a cleaning bath, including one or more walls, containing cleaning fluid into which the rotationally symmetrical bodies may be submerged, wherein the cleaning bath has one or more characteristics selected from a group consisting of heat isolated, oscillation dampened, and sound isolated;

a plurality of vibrators on the walls of the cleaning bath to agitate the cleaning fluid in the cleaning bath to place the cleaning fluid in a state of turbulence;

a heater to heat the cleaning fluid; and a holding device to receive at least one wheel rim irrespective of whether the wheel rim has a tire attached thereto.

29. The cleaning apparatus according to claim 28, wherein a rotational body and the wheel rim are arranged rotatably in the receiving holder.

30. The cleaning apparatus according to claim 28, further comprising:

a rotational drive to drive the rotationally symmetrical bodies, the rotationally symmetrical bodies being rotatably supported on a receiving holder in the cleaning bath.

31. The cleaning apparatus according to claim 30, wherein the rotationally symmetrical bodies are tires.

32. A cleaning apparatus for cleaning rotationally symmetrical bodies, comprising:

a cleaning bath, including one or more walls, containing cleaning fluid into which the rotationally symmetrical bodies are submerged, wherein the cleaning bath has one or more characteristics selected from a group consisting of heat isolated, oscillation dampened, and sound isolated;

a plurality of vibrators on the one or more walls of the cleaning bath to agitate the cleaning fluid in the cleaning bath to place the cleaning fluid in a state of turbulence; and a holder having an inwardly and outwardly swiveable receiving device to receive the rotationally symmetrical bodies to be cleaned.

33. The cleaning apparatus of claim 32, wherein at least one of the plurality of vibrators is an ultrasound vibrator to place the cleaning fluid in a state of turbulence near the ultrasound vibrator.

34. Cleaning apparatus according to claim 32, wherein the cleaning bath further comprises one from a group consisting of a heat isolated cover, a sound isolated cover, and an oscillation dampened cover.

35. The cleaning apparatus according to claim 32, further comprising a heater to heat the cleaning fluid.

36. The cleaning apparatus according to claim 32, wherein at least one of the plurality of vibrators comprises a piezoelectric transducer.

37. The cleaning apparatus according to claim 36, wherein at least one of the plurality of vibrators is operated at 25 to 30 kHz.

38. The cleaning apparatus according to claim 32, wherein the plurality of vibrators are arranged in the cleaning bath to be completely surrounded by the cleaning fluid.

39. The cleaning apparatus according to claim 32, wherein the cleaning bath further comprises one from a group consisting of a heat isolated cover, a sound isolated cover, and an oscillation dampened cover.

40. The cleaning apparatus according to claim 32, further comprising:

a supply line, the supply line operable to shut off flow therethrough; and a drain line, the drain line operable to shut off flow therethrough.

41. The cleaning apparatus according to claim 32, wherein the cleaning bath is coupled via a supply line and a drain line to a dirt and oil separator for separating pollution material contained in the cleaning fluid, the supply line and the drain line operable to shut off flow therethrough.

42. The cleaning apparatus according to claim 32, further comprising a holding device coupled to the cleaning bath.

43. The cleaning apparatus according to claim 32, further comprising a control apparatus to control at least one of the plurality of vibrators.

44. The cleaning apparatus according to claim 32, wherein the rotationally symmetrical bodies are tires.

45. A cleaning apparatus for cleaning rotationally symmetrical bodies, comprising:

a cleaning bath, including one or more walls, containing cleaning fluid into which the rotationally symmetrical bodies are submerged, wherein the cleaning bath has one or more characteristics selected from a group consisting of heat isolated, oscillation dampened, and sound isolated;

a plurality of vibrators on the one or more walls of the cleaning bath to agitate the cleaning fluid in the cleaning bath to place the cleaning fluid in a state of turbulence; and a holding device arranged in a receiving holder in the cleaning bath, the holding device being structurally separable from the cleaning apparatus.

46. The cleaning apparatus according to claim 45, wherein a rotational body and the wheel rim are arranged rotatably in the receiving holder.

47. The cleaning apparatus according to claim 46, further comprising:

a rotational drive to drive the rotationally symmetrical bodies, the rotationally symmetrical bodies being rotatably supported on a receiving device in the cleaning bath.

48. The cleaning apparatus according to claim 47, wherein the rotationally symmetrical bodies are tires.

49. A cleaning apparatus for cleaning rotationally symmetrical bodies, comprising:

a cleaning bath, including one or more walls, containing cleaning fluid into which the rotationally symmetrical bodies are submerged, wherein the cleaning bath has one or more characteristics selected from a group consisting of heat isolated, oscillation dampened, and sound isolated;

a plurality of vibrators on the one or more walls of the cleaning bath to agitate the cleaning fluid in the cleaning bath to place the cleaning fluid in a state of turbulence; and a holding device to receive at least one wheel rim irrespective of whether the wheel rim has a tire attached thereto.

50. A cleaning apparatus, comprising:

a cleaning bath, having one or more walls, containing cleaning fluid into which one or more tires may be submerged;

a first ultrasound vibrator on one of the walls of the cleaning bath to agitate the cleaning fluid in the cleaning bath to place the cleaning fluid in a state of turbulence near the first ultrasound vibrator;

a holding device to receive at least one tire; and a second ultrasound vibrator coupled to the holding device to agitate the cleaning fluid near a rim of the tire.

* * * * *